(12) United States Patent
Deng

(10) Patent No.: US 11,461,628 B2
(45) Date of Patent: Oct. 4, 2022

(54) METHOD FOR OPTIMIZING NEURAL NETWORKS

(71) Applicant: Samsung Electronics Co., Ltd., Suwon-si (KR)

(72) Inventor: Weiran Deng, Woodland Hills, CA (US)

(73) Assignee: Samsung Electronics Co., Ltd.

(*) Notice: Subject to any disclaimer, the term of this patent is extended or adjusted under 35 U.S.C. 154(b) by 996 days.

(21) Appl. No.: 15/864,582

(22) Filed: Jan. 8, 2018

(65) Prior Publication Data
US 2019/0138896 A1    May 9, 2019

Related U.S. Application Data

(60) Provisional application No. 62/581,360, filed on Nov. 3, 2017.

(51) Int. Cl.
*G06N 3/08* (2006.01)
*G06N 3/04* (2006.01)

(52) U.S. Cl.
CPC ............. *G06N 3/08* (2013.01); *G06N 3/0454* (2013.01)

(58) Field of Classification Search
CPC ........ G06N 3/08; G06N 3/0454; G06N 3/082; G06N 20/10; G06N 3/0445; G06N 3/0472; G06N 3/084
USPC ........................................................ 706/25
See application file for complete search history.

(56) References Cited

U.S. PATENT DOCUMENTS

| | | | |
|---|---|---|---|
| 5,640,494 A * | 6/1997 | Jabri | G06N 3/084 706/25 |
| 8,700,552 B2 * | 4/2014 | Yu | G06N 3/08 706/25 |
| 10,223,610 B1 * | 3/2019 | Akselrod-Ballin | G06K 9/6273 |
| 10,891,538 B2 * | 1/2021 | Dally | G06F 9/3851 |
| 2014/0201126 A1 | 7/2014 | Zadeh et al. | |
| 2016/0006543 A1 * | 1/2016 | Winstead | H03M 13/1108 714/760 |
| 2017/0098140 A1 | 4/2017 | Wang et al. | |
| 2019/0050734 A1 * | 2/2019 | Li | G06N 3/0454 |
| 2019/0108436 A1 * | 4/2019 | David | G06N 3/02 |

(Continued)

FOREIGN PATENT DOCUMENTS

| | | | |
|---|---|---|---|
| EP | 3091486 A2 * | 11/2016 | ............. G06N 3/08 |
| WO | WO-2017207138 A1 * | 12/2017 | ........... G06N 3/0454 |

OTHER PUBLICATIONS

Blundell et al., "Weight Uncertainty in Neural Networks," 2015, Proceedings of the 32nd International Conference on Machine Learning, JMLR: W&CP vol. 37, 10 pages (Year: 2015).*

(Continued)

*Primary Examiner* — Alan Chen
(74) *Attorney, Agent, or Firm* — Innovation Counsel LLP

(57) ABSTRACT

A method includes: providing a deep neural networks (DNN) model comprising a plurality of layers, each layer of the plurality of layers includes a plurality of nodes; sampling a change of a weight for each of a plurality of weights based on a distribution function, each weight of the plurality of weights corresponds to each node of the plurality of nodes; updating the weight with the change of the weight multiplied by a sign of the weight; and training the DNN model by iterating the steps of sampling the change and updating the weight. The plurality of weights has a high rate of sparsity after the training.

20 Claims, 7 Drawing Sheets

(56) References Cited

U.S. PATENT DOCUMENTS

| | | | |
|---|---|---|---|
| 2019/0197401 A1* | 6/2019 | Jaganathan | G06N 3/0472 |
| 2020/0234130 A1* | 7/2020 | Yan | G06N 3/0454 |
| 2020/0234137 A1* | 7/2020 | Chen | G06N 3/0454 |
| 2020/0342315 A1* | 10/2020 | Achterhold | G06N 3/08 |
| 2020/0349946 A1* | 11/2020 | Howard | G10L 15/16 |

OTHER PUBLICATIONS

Kim et al., "Deep neural network with weight sparsity control and pre-training extracts hierarchical features and enhances classification performance: Evidence from whole-brain resting state functional connectivity patterns of schizophrenia," 2016, Neuroimage, pp. 1-54 (Year: 2016).*

Srinivas et al., "Training Sparse Neural Networks," Nov. 21, 2016, arXiv:1611.06694v1 [cs.CV], 7 pages (Year: 2016).*

Rumelhart et al., "Learning Representations by Back-Propagating Errors," Letters to Nature, vol. 323, Oct. 9, 1986, pp. 533-536.

Neelakantan, et al., "Adding Gradient Noise Improves Learning for Very Deep Networks," Under Review as a Conference Paper at ICLR 2017, 14 pages.

Lecun et al., "Gradient-Based Learning Applied to Document Recognition," Proc. of the IEEE, Nov. 1998, 46 pages.

Minnaar, Alex, "Deep Learning Basics: Neural Networks, Backpropagation and Stochastic Gradient Descent," http://alexminnaar.com/deep-learning-basics-neural-networks-backpropagation-and-stochastic-gradient-descent.html, Feb. 14, 2015, 9 pages.

Blundell et al., "Weight Uncertainty in Neural Networks," Proceedings of the 32nd International Conference on Machine Learning, Lille, France, 2015, 10 pages.

\* cited by examiner

Iteration 0

Iteration 2000

Iteration 4000

Iteration 6000

Iteration 8000

METHOD FOR OPTIMIZING NEURAL NETWORKS

CROSS-REFERENCE TO RELATED APPLICATION(S)

This application claims the benefits of and priority to U.S. Provisional Patent Application Ser. No. 62/581,360 filed Nov. 3, 2017, the disclosure of which is incorporated herein by reference in its entirety.

TECHNICAL FIELD

The present disclosure relates generally to neural networks, more particularly, to a system and method for optimizing the performance of deep neural networks using weight perturbation.

BACKGROUND

Neural networks are a set of algorithms, modeled loosely after the human brain, that are designed to recognize patterns. Deep neural networks (DNN) refer to neural networks that are tailored for deep learning. DNN can be applied to computer vision such as pattern recognition, image classification, object detection, and segmentation. DNN has a tremendous commercial potential for other complex applications such as autonomous driving and augmented reality (AR) or virtual reality (VR).

Convolutional neural networks (CNNs) are a special kind of multi-layer neural networks. Similar to other neural networks, CNNs are trained with a back-propagation algorithm, but are different from typical multi-layer neural networks in their architecture. CNNs are specifically designed to recognize visual patterns directly from pixel images with minimal preprocessing. CNNs can recognize visual patterns with extreme variability (such as handwritten characters) with robustness to distortions and simple geometric transformations.

The DNN that employs a deep learning model such as a CNN model requires powerful computing resources and extensive data storage resources, which can be one of major obstacles in deployment of DNN. To increase the performance of deep learning CNN, a plethora of methods have been proposed including weight pruning, quantization, compression, and performing convolutions in a transformed domain such as Winograd.

SUMMARY

According to one embodiment, a method includes: providing a deep neural networks (DNN) model comprising a plurality of layers, each layer of the plurality of layers includes a plurality of nodes; sampling a change of a weight for each of a plurality of weights based on a distribution function, each weight of the plurality of weights corresponds to each node of the plurality of nodes; updating the weight with the change of the weight multiplied by a sign of the weight; and training the DNN model by iterating the steps of sampling the change and updating the weight. The plurality of weights has a high rate of sparsity after the training.

According to another embodiment, a computer system includes: an image repository including a plurality of images; and a processor configured to run a deep neural networks (DNN) model comprising a plurality of layers, each layer of the plurality of layers includes a plurality of nodes. The processor is further configured to: sample a change of a weight for each of a plurality of weights based on a distribution function, each weight of the plurality of weights corresponds to each node of the plurality of nodes; update the weight with the change of the weight multiplied by a sign of the weight; and train the DNN model by iterating the steps of sampling the change and updating the weight. The plurality of weights has a high rate of sparsity after the training. The processor is further configured to receive an image, classify or segment the image, or detect an object within an image and update the image repository.

The above and other preferred features, including various novel details of implementation and combination of events, will now be more particularly described with reference to the accompanying figures and pointed out in the claims. It will be understood that the particular systems and methods described herein are shown by way of illustration only and not as limitations. As will be understood by those skilled in the art, the principles and features described herein may be employed in various and numerous embodiments without departing from the scope of the present disclosure.

BRIEF DESCRIPTION OF THE DRAWINGS

The accompanying drawings, which are included as part of the present specification, illustrate the presently preferred embodiment and together with the general description given above and the detailed description of the preferred embodiment given below serve to explain and teach the principles described herein.

Figure 1:
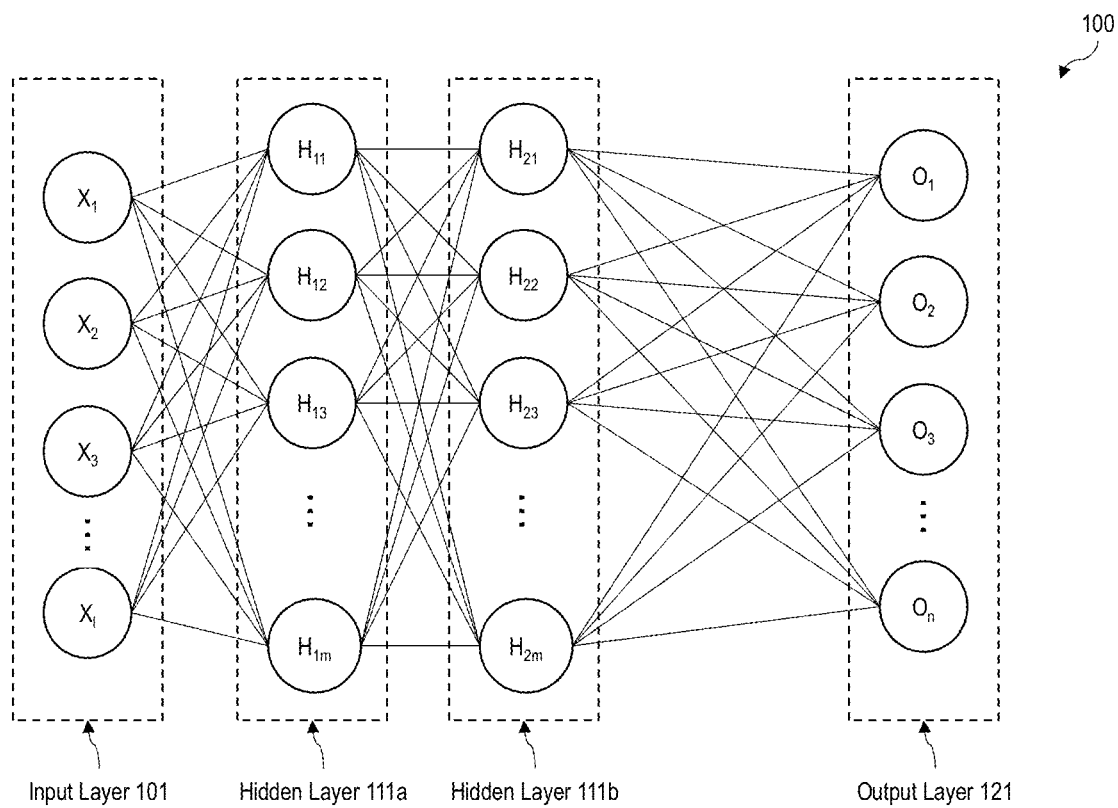
FIG. 1 is a schematic diagram of an example DNN model, according to one embodiment.

The figures are not necessarily drawn to scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims.

DETAILED DESCRIPTION

Each of the features and teachings disclosed herein can be utilized separately or in conjunction with other features and teachings to provide a system and method for optimizing the performance of deep neural networks using weight perturbation. Representative examples utilizing many of these additional features and teachings, both separately and in combination, are described in further detail with reference to the attached figures. This detailed description is merely intended to teach a person of skill in the art further details for practicing aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

In the description below, for purposes of explanation only, specific nomenclature is set forth to provide a thorough understanding of the present disclosure. However, it will be apparent to one skilled in the art that these specific details are not required to practice the teachings of the present disclosure.

Some portions of the detailed descriptions herein are presented in terms of algorithms and symbolic representations of operations on data bits within a computer memory. These algorithmic descriptions and representations are used by those skilled in the data processing arts to effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of an original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

Deep neural networks (DNN) are stacked neural networks including multiple layers. Each layer of the DNN comprises a plurality of nodes, also referred to as neurons. Each node or neuron represents a computational unit that has one or more inputs and an output. Each input from a plurality of nodes in a layer may be fed to each node in an adjacent layer. Similarly, the output may be fed to a plurality of nodes in an adjacent layer.

Weight pruning is a direct method to improve the performance of deep learning CNN by setting weights to zeros to reduce the number of multiplications and accumulation in computation. Iterative weight pruning is a time-consuming process because prediction accuracy may be lost when high-pass thresholds are applied to pre-trained weights, and the weights may need to be retrained to regain the accuracy. L1 regularization is inflexible for retraining and weight filtering.

The present disclosure describes a general method for optimizing the performance of a DNN model. More specifically, the present disclosure proposes a technique to enforce sparsity on weights of DNN layers in a DNN model. The inference of the DNN model may include a large number of convolutions, hence the DNN is also referred to as convolution neural network (CNN) in some embodiments. If a high rate of sparsity is present in weights in a layer of the DNN model, the number of multiplications in convolution operations can be greatly reduced. The present method proposes a technique to increase the sparsity of a DNN model by applying distributed random perturbation to the weights.

FIG. 1 is a schematic diagram of an example DNN model, according to one embodiment. The DNN model 100 includes multiple layers including an input layer 101, two hidden layers 111a and 111b, and an output layer 121. The input layer 101 has 1 number of nodes $X_p$ (p=1 to l), each of the hidden layers 111a and 111b has m number of nodes $H_{qr}$ (q=1 or 2, r=1 to m), and the output layer 121 has n number of nodes $O_s$ (s=1 to n). In an image recognition application, each input node $X_i$ may correspond to a pixel data of an input image.

Each node in the network is connected to every node in an adjacent layer. In the present example, the numbers l, m, n, may be the same or different from each other depending on an application of the DNN model 100. Although the present example shows only two hidden layers 111a and 111b having the same number of nodes, it is understood that any number of hidden layers and different number of nodes in each of the hidden layer may be present without deviating from the scope of the present disclosure.

The DNN model 100 may be implemented in an application running in a host computer. The host computer may have a plurality of processors such as central processing units (CPUs) and/or graphics processing units (GPUs) as computing resources of the DNN model 100. Alternatively, the DMM model 100 may be implemented in a data storage device such as a solid-state drive (SSD) that includes one or more CPUs and/or GPUs as computing resources of the DNN model 100. In some embodiments, the plurality of computing resources may be distributed over a computer system, and computation in the DNN model 100 may be distributed over one or more host computers and one or more data storage devices. For example, a host computer can run an application that recognizes an input (e.g., digitized handwritten image), and the actual computation may occur in one or more data storage devices that store reference data for processing the input.

Each of the processors can include one or more convolution engines. The convolution engines may be grouped in the input layer 101, the hidden layers 111a and 111b, and the output layer 121. The data paths from the input layer 101 to the output layer 121 through the hidden layers 111a and 111b provide a forward path or an inference path. Conversely, the data paths from the output layer 121 to the input layer 101 through the hidden layers 111a and 111b provide a backward or training path.

In some embodiments, the data storage device is compatible with the non-volatile memory (NVMe) standard or the NVMe over Fabrics (NVMeoF) standard. In this case, a host computer (not shown) running an application may be coupled to the data storage device over a variety of network fabrics including, but not limited to, Ethernet, Fibre Channel, and InfiniBand.

Figure 2:
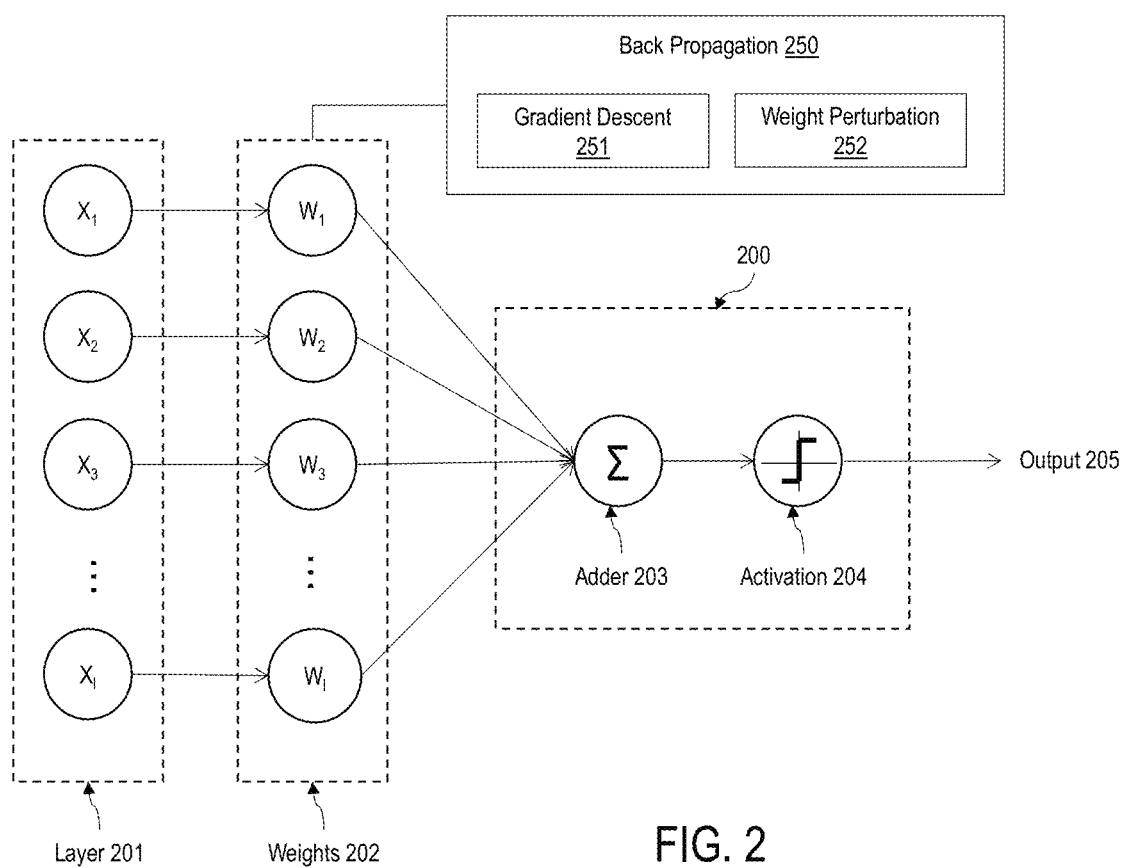
FIG. 2 shows a process of generating an output of a node in a DNN model using a plurality of inputs, according to one embodiment.

FIG. 2 shows a process of generating an output of a node in a DNN model using a plurality of inputs, according to one embodiment. The node 200 receives inputs from a plurality of nodes $X_1$ to $X_I$ in an adjacent layer 201. Each input $X_i$ is multiplied with a respective coefficient, herein referred to as a weight $W_i$. The products of the input data from the adjacent layer 201 are then added together using an adder 203 and fed to an activation logic 204. The activation logic 204 provides an output 205 by determining whether and to what extent the summed data from the adder 203 progresses further to another connected node through the DNN network to affect an ultimate outcome.

The weight $W_i$ may either amplify or dampen the associated input data, thereby assigning significance (or less significance) within the summed input data for the connected node 200. The weight $W_i$ may dynamically vary based on a deep learning algorithm to learn. Based on the significance of the input data, the weight $W_i$ may progress toward amplifying or dampening the associated input data. For instance, the weight $W_i$ may be used to filter noise or errors by damping the associated input data.

Stochastic gradient descent (SGD), also referred to as incremental gradient descent, is a stochastic approximation of a gradient descent optimization and iterative method for minimizing an objective function that is written as a sum of differentiable functions. SGD is a popular algorithm for training a wide range of models in machine learning, including (linear) support vector machines, logistic regression and graphical models.

During a training process of a DNN model, the weights are updated according to a stochastic gradient descent (SGD) algorithm. The optimization method by the SGD algorithm has a stochastic nature because training samples are randomly drawn from a large training (and trained) dataset. Neelakatan, et. al. ("Adding Gradient Noise Improve Learning for Very Deep Networks," Arxiv: 1511.06807) demonstrated that additional noise can be added to the weights during training to increase the robustness of a DNN model. Neelakatan shows that the accuracy of a DNN model can be increased by introducing random noise to the weights.

The present system and method for optimizing the performance of a DNN model includes an additional step following an ad-hoc DNN training method such as Stochastic Gradient Descent (SGD). In each training step of SGD, the weight gradient is calculated as a derivative of a loss function with respect to the weight, and the weight is updated by accumulating the product of a learning rate and a negative of the weight gradient. After this step, a new weight is perturbed according to a distribution function. The optimization method using a stochastic gradient descent (SGD) algorithm can lead to a higher rate of sparsity of the weights that results in reduction of the number of multiplications and saving the computational time and cost.

The process of applying stochastic perturbation to weights during training is conceptually similar to a cooling process of atoms in quantum mechanics. When the temperature is lowered, electrons in a quantized energy state follow a specific distribution, and electrons have higher probability to reside in lower energy states. According to one embodiment, a perturbation by a decay distribution as in quantum mechanics is applied to weights in the present DNN model. As the iteration progresses during training, the weights have a higher probability to stochastically shift to a lower energy state (i.e., smaller weight values). The shifting process of the weights may be gradual but persistent. After a large number of iterations, this tiny stochastic transition not only increases the robustness of the DNN model as is demonstrated by Neelakatan, but also shifts weights towards zero and therefore achieving a higher rate of sparsity of the weights.

In the context of quantum mechanics, the probability distribution of atoms at different energy level may follow Boltzmann distribution:

$$P(E_n) = \exp(-E_n/kT)/\Sigma_i \; \exp\left(-\frac{E_i}{kT}\right), \quad \text{(Eq. 1)}$$

where E is energy, k is Boltzmann constant, T is temperature. As the temperature decreases, the probability for the atoms to move to lower energy states increases thereby reducing entropy.

The concept of Boltzmann distribution (i.e., exponential decay distribution) can be expanded to the training of a DNN model. In one embodiment, the DNN model uses a stochastic gradient descent (SGD) to minimize a cost function or a loss function, which is a sum of a squared difference or an absolute difference between the prediction and the ground truth. During the training process, a perturbation process can be applied to the weights such that the weights gradually redistributes towards a new distribution that has a lower energy state (i.e., lower entropy) and a higher rate of sparsity.

The training of a DNN can be done through back propagation. The weights of each layer are updated using stochastic gradient descent (SGD). A perturbation following a probability distribution function is introduced to allow weights to redistribute with the following two conditions; (1) positive weights can only decrease and negative ones can only increase; and (2) the perturbation of the weight values should be small enough not to invalidate the convergence of SGD. For example, a weight update can be drawn randomly from a distribution function $P(X)=\lambda_1 e^{-\lambda_2 X}$. In the distribution function $P(X)$, smaller values have higher probability than larger values to be drawn. This ensures that small updates are more likely to be applied to the weights. The sign of the weight updates is always the opposite of the weights. The parameters $\lambda_1$ and $\lambda_2$ are hyper-parameters and can be heuristically chosen.

In one embodiment, an exponential decay distribution function can be used as a probability distribution function $P(X)=\lambda_1 e^{-\lambda_2 X}$. The magnitude of a change $\Delta w$ for each weight w can be sampled from the exponential decay distribution function $P(X)$. The weight change $\Delta w$ is iteratively applied to the weight w with the sign of the weight, i.e., sign(w)$\Delta w$ such that the weights move stochastically towards zero. However, it is noted the present disclosure is not limited to the exponential decay distribution, and various other probability distribution functions that have a decaying probability for large values can be used without deviating from the scope of the present disclosure. Any probability distribution function for weight transition that satisfies the above-mentioned two conditions may be used.

The standard SGD is augmented with an inner loop, in which the weight perturbation is applied. The transition of weights following the selected probability distribution function is applied in the inner loop within the SGD. Within the inner loop, the weight perturbation is recursively applied following the same distribution such that the weight stochastically shifts to zero. Referring to FIG. 2, the weights $W_i$ are perturbed and applied using a back propagation unit 250. The back propagation unit 250 includes a stochastic gradient descent (SGD) 251 and a weight perturbation logic 252. The back propagation unit 250 may be implemented in a processor or in a convolution engine of a processor. The hardware implementation of the back propagation unit 250 may include a random number generating hardware that generates a small weight perturbation and applies the weight perturbation to the weights at a hardware level.

Figure 3:
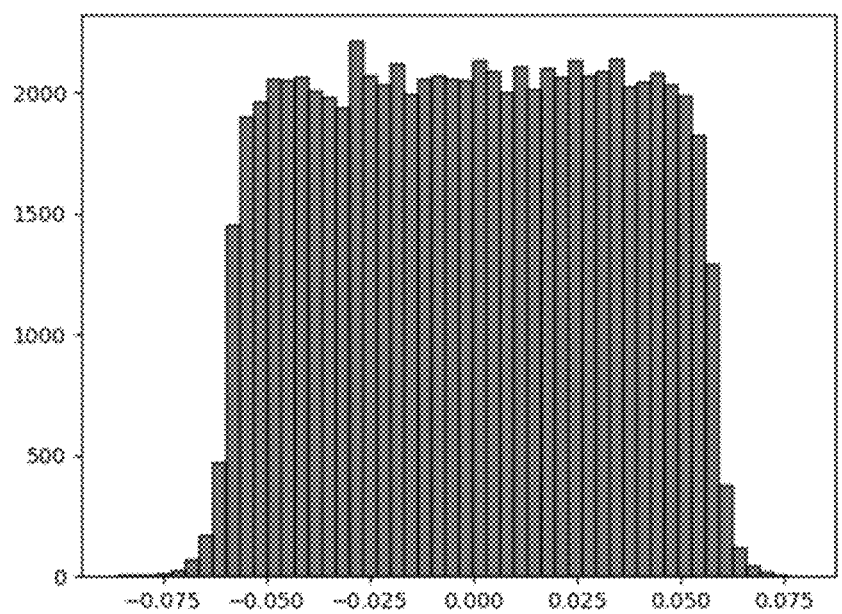
FIG. 3 shows progression of weight values in an example DNN model in a training process, according to one embodiment.
Figure 3:
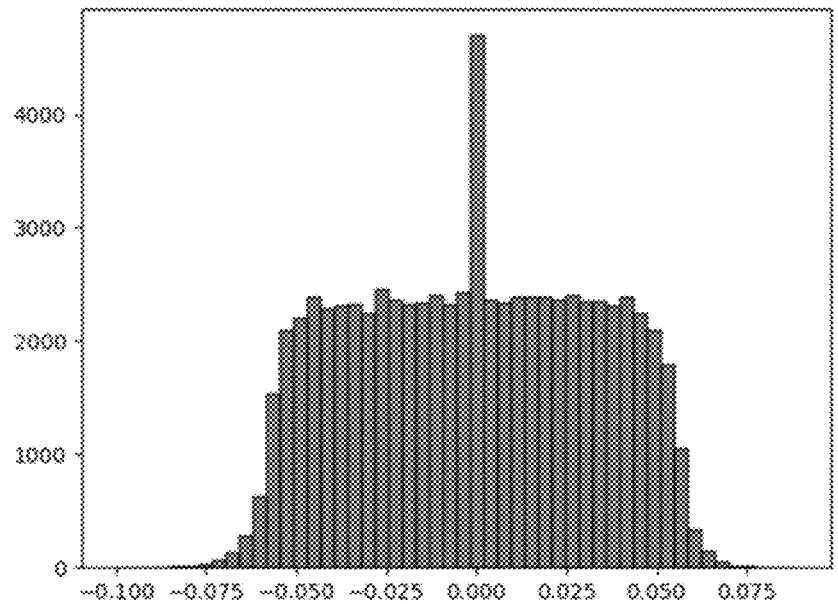
Figure 3:
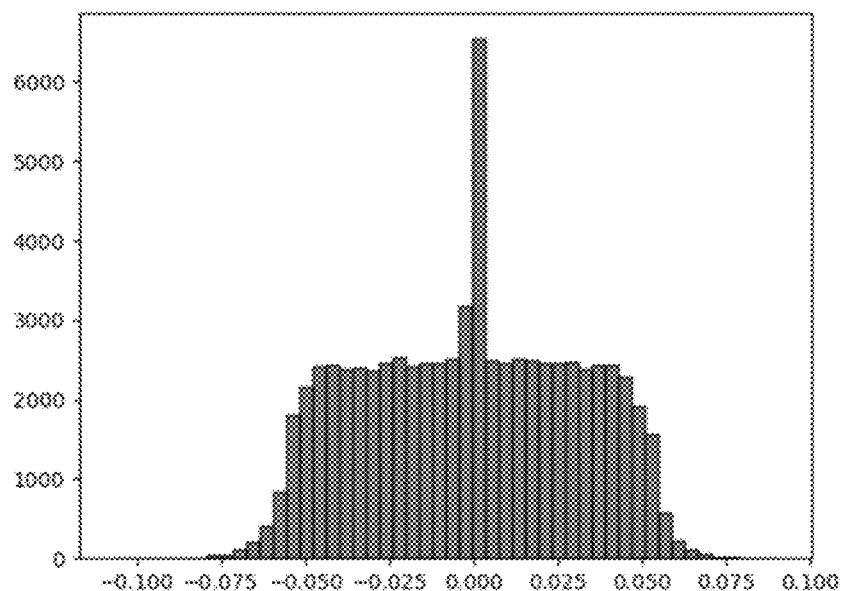
Figure 3:
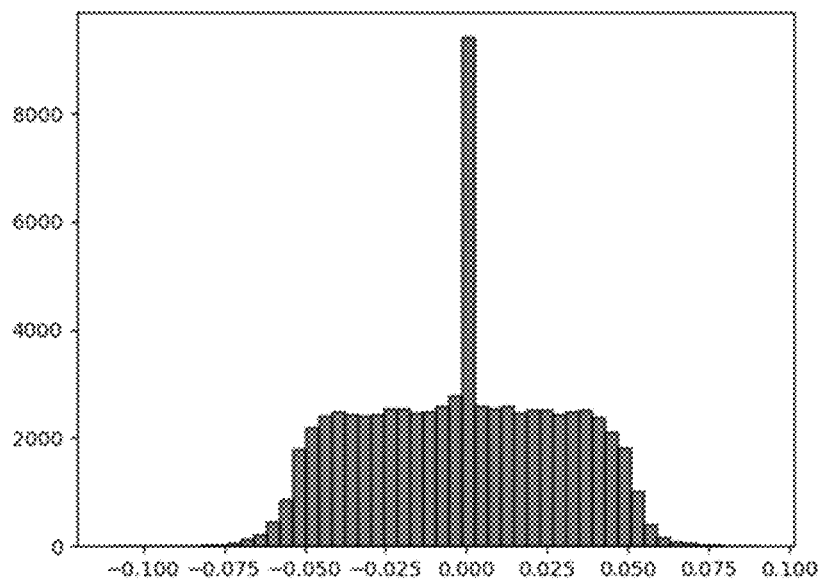
Figure 3:
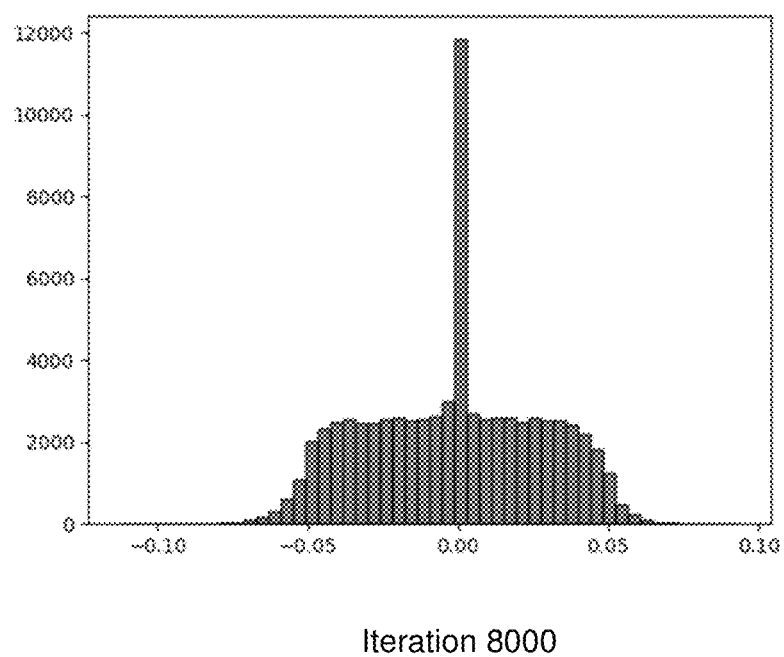

FIG. 3 shows progression of weight values in an example DNN model in a training process, according to one embodiment. Each histogram of weight values in FIG. 3 shows weight values of one of the layers of the DNN model on the MNIST data set at different iterations from iteration 0 to 8000. The MNIST data set contains tens of thousands of scanned images of handwritten digits, together with their correct classifications. MNIST's name comes from the fact that it is a modified subset of two data sets collected by the United States' National Institute of Standards and Technology (NIST). In the present example, the MNIST data set is trained for 10,000 iterations. As the training progresses over iterations, the number of zero weights gradually increases while the accuracy on the validation datasets increases from 96.38% to 98.92%. The MNIST dataset includes 60,000 images for training and 10,000 images for validation. The images in the validation dataset are used to predict the classification of the trained models and comparison to the ground truth for accuracy.

Figure 4A:
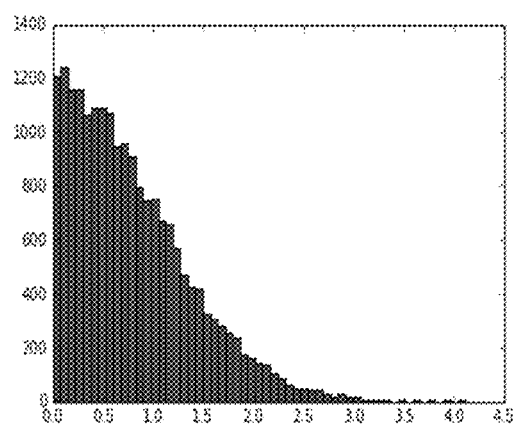
FIG. 4A shows a histogram of absolute weight values from an L2 regularization as a comparative example.
Figure 4B:
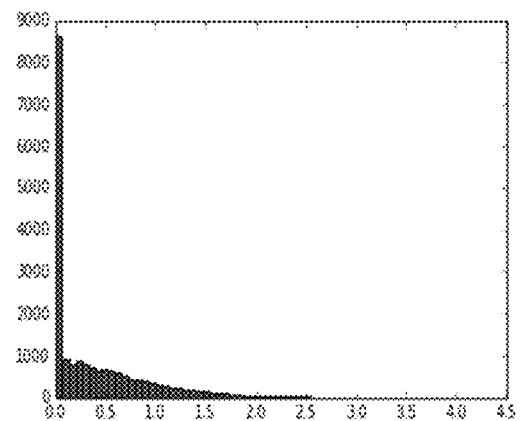
FIG. 4B shows a histogram of absolute weight values according to an example weight perturbation, according to one embodiment.

FIG. 4A shows a histogram of absolute weight values from an L2 regularization as a comparative example. FIG. 4B shows a histogram of absolute weight values according to an example weight perturbation, according to one embodiment. The results shown in FIG. 4A and FIG. 4B are obtained using the same conditions/parameters except the regularization/perturbation scheme.

Typically, network weights in a conventional DNN model are trained with a L2 regularization. The L2 regularization is equivalent to applying Gaussian prior to the weight distribution from Bayesian learning perspective. In contrast, the present DNN model employs an application of a stochastic perturbation following an exponential decay distribution to the weights of nodes in the network during training. Resultantly, the weight values exhibit a distribution with increased sparsity in FIG. 4B as compared to the L2 regularization shown in FIG. 4A.

According to one embodiment, a stochastic perturbation following Eq. (1) is applied to all layers in a convolutional neural network, herein referred to as a LeNet-5 model. The weights are pre-trained using the standard SGD with a learning rate 0.001 for 10,000 iterations. The weight perturbation is applied to the pre-trained model.

Figure 5:
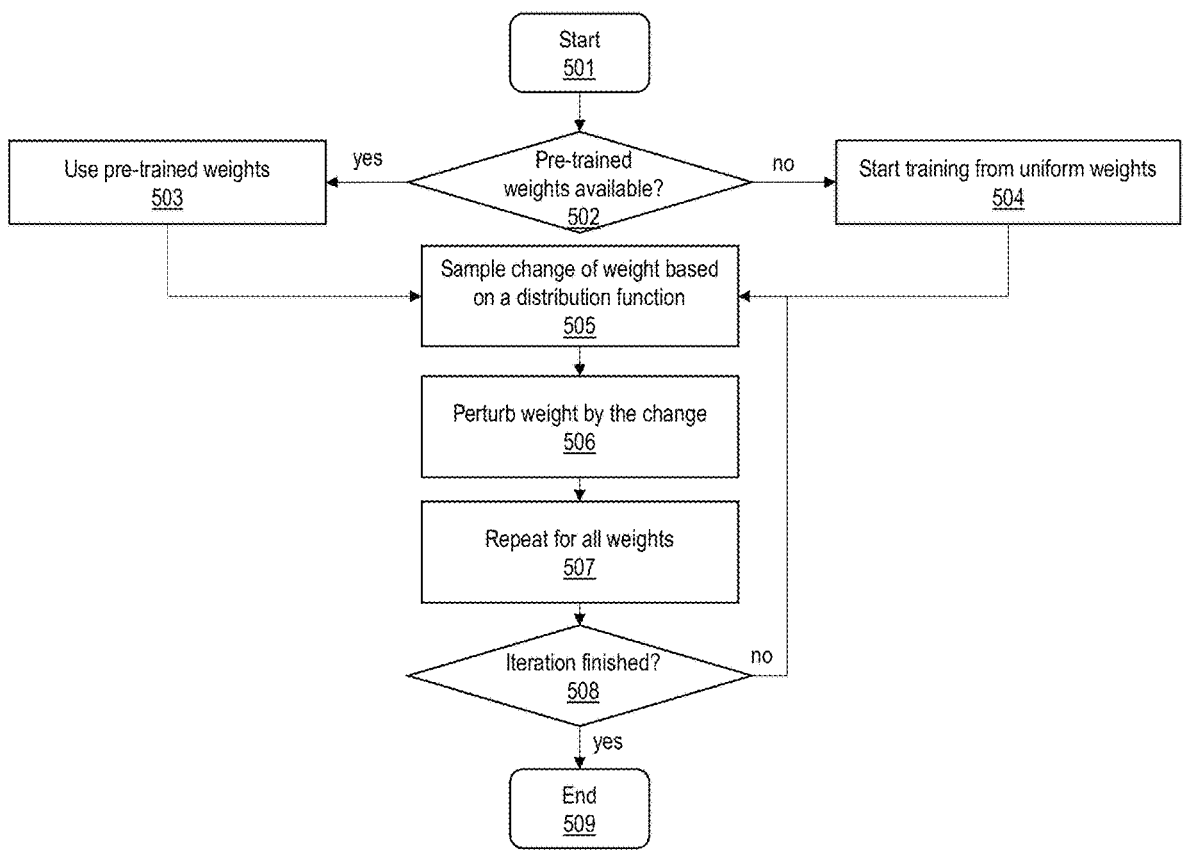
FIG. 5 is a flowchart for an example process for applying perturbation to weights, according to one embodiment.

FIG. 5 is a flowchart for an example process for applying perturbation to weights, according to one embodiment. The training for a DNN model starts (501). First, it is checked whether pre-trained weights in a layer of the DNN model are available (502). If so, the training starts with the pre-trained weights (503), otherwise, the training starts from scratch, for example, with uniformly distributed weights (504). A change of a weight is sampled based on a distribution function (506), and the weight is perturbed by the change (507). The weight update is performed on all weights in the layer of the DNN model (507). Weights for each layer of the DNN model may be updated. The process repeats until the iteration is finished (508). After the iteration is finished, the weights have a high rate of sparsity, and the training for the DNN model ends (509). In some embodiments, a predetermined number of iterations is performed. In another embodiment, the iteration process may continue until a predetermined rate of sparsity is achieved.

The present system and method augments SGD and optimizes the performance of DNN by perturbing weights in a layer. It is understood that the present system and method for optimizing the performance of DNN can be applied to not only convolution neural networks but also other networks such as Recurrent Neural Networks (RNN). SGD can be used for training. The present system and method can be combined with a mixture of multiple distributions of weights for weight clustering.

The present system and method for optimizing the performance of a DNN model can be implemented in a software framework that can run in a hardware device such as a computer system. The present system and method can be applied to various application such as computer vision including pattern recognition, image classification, object detection, and segmentation. The performance-optimized DNN model can be further applied to other commercial applications such as autonomous driving and augmented reality (AR) or virtual reality (VR).

In an example of a computer-vision application, the present DNN model can receive inputs of images from a computer system such as a smartphone. Referring to FIG. 1, each input node $X_i$ may correspond to a pixel data of an input image. The computer system may include an image sensor or a camera to take an input image.

In another example, the computer system can load an image from an image repository for pattern recognition or matching. A user of the computer system can select an image for searching related images. For example, the user selects an image including a person, and the present system and method can provide other images that include the same person. Because the present system and method provides an optimized DNN model that can have a higher rate of sparsity of the weights, the number of multiplications for image recognition or pattern matching can be reduced, and the computational time and cost can be saved.

According to one embodiment, a method includes: providing a deep neural networks (DNN) model comprising a plurality of layers, each layer of the plurality of layers includes a plurality of nodes; sampling a change of a weight for each of a plurality of weights based on a distribution function, each weight of the plurality of weights corresponds to each node of the plurality of nodes; updating the weight with the change of the weight multiplied by a sign of the weight; and training the DNN model by iterating the steps of sampling the change and updating the weight. The plurality of weights has a high rate of sparsity after the training.

The deep neural networks may be convolutional neural networks (CNN).

The deep neural networks may be Recurrent Neural Networks (RNN).

The distribution function may be an exponential decay function.

The weights may be updated during training using a stochastic gradient descent (SGD) algorithm.

An amount of change in each step of updating the weight may be small enough not to invalidate the convergence of the SGD algorithm.

The method may further include: determining whether pre-trained weights are available, and using the pre-trained weights.

The method may further include: combining a mixture of multiple distributions of weights for weight clustering.

A predetermined number of iterations may be performed.

The iteration may continue until a predetermined rate of sparsity is achieved.

The DNN model may be implemented in a software framework of a computer system.

The computer system may include a random number generating hardware configured to generate a weight perturbation and apply the weight perturbation to the weight.

The computer system may include an image sensor or a camera for receiving an image input.

The DNN model may be applied to a computer-vision application including image classification, image segmentation, and object detection.

The DNN model may be applied to autonomous driving, augmented reality (AR), or virtual reality (VR).

According to another embodiment, a computer system includes: an image repository including a plurality of images; and a processor configured to run a deep neural networks (DNN) model comprising a plurality of layers, each layer of the plurality of layers includes a plurality of nodes. The processor is further configured to: sample a change of a weight for each of a plurality of weights based on a distribution function, each weight of the plurality of weights corresponds to each node of the plurality of nodes; update the weight with the change of the weight multiplied by a sign of the weight; and train the DNN model by iterating the steps of sampling the change and updating the weight. The plurality of weights has a high rate of sparsity after the training. The processor is further configured to receive an image, classify or segment the image, or detect an object within an image and update the image repository.

The computer system may further include: a random number generating hardware configured to generate a weight perturbation and apply the weight perturbation to the weight.

The computer system may further include an image sensor or a camera for receiving an image input.

The processor may train the DNN model using the input image and update the images stored in the image repository.

The DNN model may be applied to autonomous driving, augmented reality (AR), or virtual reality (VR).

The above example embodiments have been described hereinabove to illustrate various embodiments of implementing a system and method for optimizing the performance of deep neural networks using weight perturbation. Various modifications and departures from the disclosed example embodiments will occur to those having ordinary skill in the art. The subject matter that is intended to be within the scope of the invention is set forth in the following claims.

What is claimed is:

1. A method comprising:
providing a deep neural networks (DNN) model comprising a plurality of nodes;
sampling a change of a weight of a plurality of weights that corresponds to the plurality of nodes based on a distribution function;
updating the weight with the change of the weight multiplied by a mathematical sign of the weight; and
training the DNN model by iterating the steps of sampling the change and updating the weight,
wherein the mathematical sign of the weight update is always opposite of the weight at each iteration, so that a positive weight is decreasingly updated, and a negative weight is increasingly updated, and
wherein the plurality of weights has a high rate of sparsity after the training.

2. The method of claim 1, wherein the deep neural networks are convolutional neural networks (CNN).

3. The method of claim 1, wherein the deep neural networks are Recurrent Neural Networks (RNN).

4. The method of claim 1, wherein the distribution function is an exponential decay function.

5. The method of claim 1, wherein the weights are updated during training using a stochastic gradient descent (SGD) algorithm.

6. The method of claim 5, wherein an amount of change in a step of updating the weight is small enough not to invalidate the convergence of the SGD algorithm.

7. The method of claim 1, further comprising: determining whether pre-trained weights are available, and using the pre-trained weights.

8. The method of claim 1, further comprising: combining a mixture of multiple distributions of weights for weight clustering.

9. The method of claim 1, wherein a predetermined number of iterations is performed.

10. The method of claim 1, wherein the iteration continues until a predetermined rate of sparsity is achieved.

11. The method of claim 1, wherein the DNN model is implemented in a software framework of a computer system.

12. The method of claim 1, wherein the computer system includes a random number generating hardware that generates a weight perturbation and apply the weight perturbation to the weight.

13. The method of claim 11, wherein the computer system includes an image sensor or a camera for receiving an image input.

14. The method of claim 12, wherein the DNN model is applied to a computer-vision application including image classification, image segmentation, and object detection.

15. The method of claim 12, wherein the DNN model is applied to autonomous driving, augmented reality (AR), or virtual reality (VR).

16. A computer system comprising:
an image repository including a plurality of images; and
a processor configured running a deep neural networks (DNN) model comprising a plurality of nodes,
wherein the processor performs to:
sample a change of a weight of a plurality of weights that corresponds to the plurality of nodes based on a distribution function;
update the weight with the change of the weight multiplied by a mathematical sign of the weight; and
train the DNN model by iterating the steps of sampling the change and updating the weight,
wherein the mathematical sign of the weight update is always opposite of the weight at each iteration, so that a positive weight is decreasingly updated, and a negative weight is increasingly updated,
wherein the plurality of weights has a high rate of sparsity after the training, and
wherein the processor further performs to receive an image, classify or segment the image, or detect an object within an image and update the image repository.

17. The computer system of claim 16, further comprising a random number generating hardware that generates a weight perturbation and apply the weight perturbation to the weight.

18. The computer system of claim 16, further comprising an image sensor or a camera for receiving an image input.

19. The computer system of claim 18, wherein the processor trains the DNN model using the input image and updates the images stored in the image repository.

20. The computer system of claim 16, wherein the DNN model is applied to autonomous driving, augmented reality (AR), or virtual reality (VR).

* * * * *